July 7, 1970  HIROSHI ISHIZUKA  3,519,258
DEVICE FOR REDUCING CHLORIDES
Filed Dec. 30, 1966  4 Sheets-Sheet 1

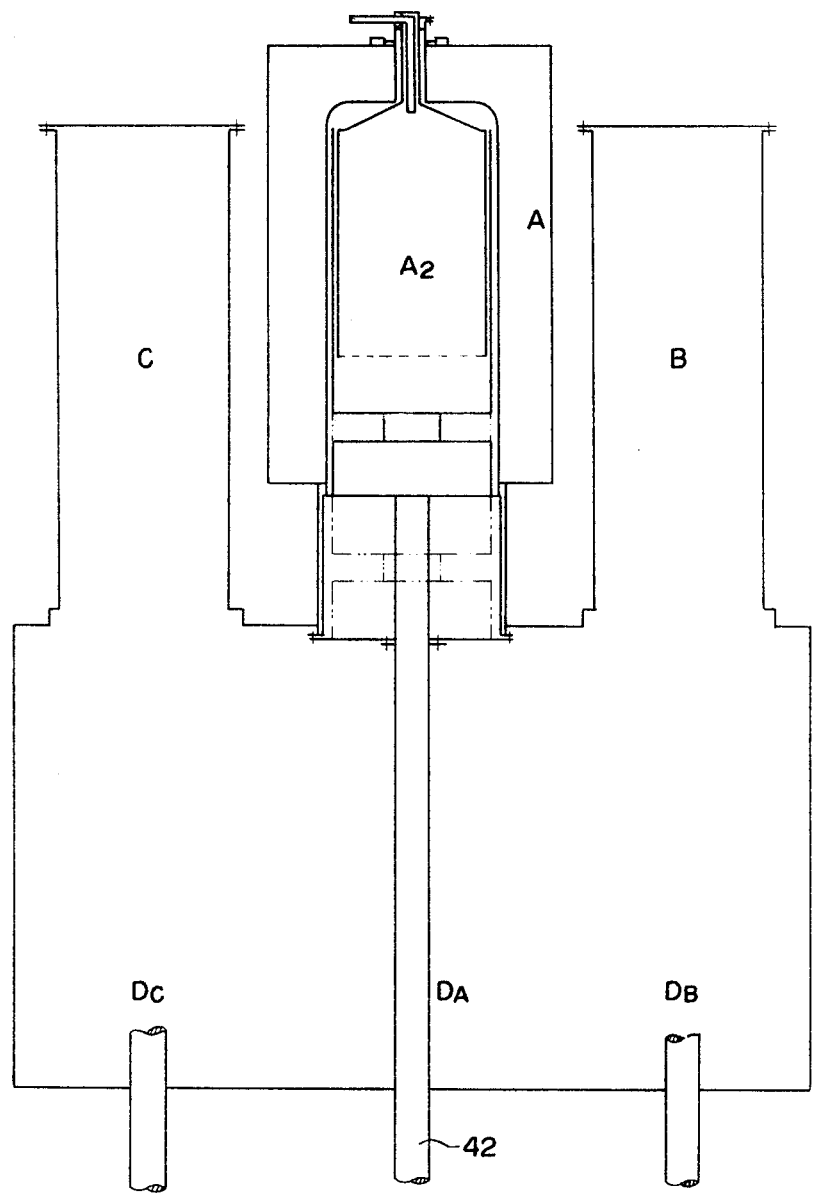

United States Patent Office 3,519,258
Patented July 7, 1970

3,519,258
DEVICE FOR REDUCING CHLORIDES
Hiroshi Ishizuka, 19-2 Ebara 6-chome Shinagawa-ku, Tokyo, Japan
Filed Dec. 30, 1966, Ser. No. 606,331
Claims priority, application Japan, July 23, 1966, 41/48,415
Int. Cl. C21b 7/00
U.S. Cl. 266—34                 3 Claims

ABSTRACT OF THE DISCLOSURE

A device for reducing volatile chlorides and simultaneously reducing and refining same, comprising an outer cylindrical member having an open bottom which is sealingly closed with a removable bottom plate, a furnace for heating reactants from without the outer cylindrical member, an intermediate cylindrical member having an open top and a bottom which has an outlet for discharging byproducts, an inner cylindrical member having a screen at the lower end thereof and an inlet for charging raw volatile chlorides through a pipe means, and a means for lifting said intermediate cylindrical member so as to closely fit the same between said outer and inner cylindrical members and to completely close the open bottom of said outer cylindrical member, and for descending said intermediate cylindrical member after completion of the normal reducing reaction and having discharged reducing agent and most part of byproducts formed through the reaction, so as to refine the resulting products by decreasing inner pressure and by evaporating byproducts remaining in the products.

---

This invention relates to a device for reducing metallic chlorides and for simultaneously reducing and refining same and more particularly to a device for the production of metallic titanium, zirconium, hafnium, columbium, tantalum, or the like by reducing the volatile chlorides thereof in gaseous or liquid phase with metallic reducing agents, for instance reducing titanium tetrachloride, zirconium tetrachloride, hafnium tetrachloride, columbium pentachloride, tantalum pentachloride, or the like with magnesium or sodium.

Recent developments in the art of metallurgy have made it possible to manufacture such metals as titanium, zirconium, hafnium, columbium, tantalum, etc. on an industrial scale, the refining of which had been considered impossible until then. Most of such metals have been heretofore produced by preparing volatile halides thereof and reducing the halides with a metallic reducing agent, e.g. magnesium or sodium. For instance, metallic titanium and metallic zirconium have been heretofore produced by the so-called chlorine method, in which the chlorides of the metals are reduced by magnesium.

Such prior art, however, has disadvantages in that the reduction of chlorides of such metals requires a considerably long reaction time in excess of 50 hours, and that the reaction chamber used is apt to produce local low temperature regions which leads to a decrease in yield.

Therefore, the principal object of the present invention is to provide a novel device for reducing volatile chlorides which is free from the aforementioned difficulties.

Another object of the present invention is to provide a device for producing extremely high purity metals by simultaneously reducing and refining the corresponding volatile chlorides while obviating the problems noted above.

Other objects and advantages of the present invention will be made clear by reference to the following description taken in conjunction with the accompanying drawings, in which;

FIG. 4 is a similar view to FIG. 2, illustrating a device for enabling semi-continuous operation of the device of FIG. 3.

Similar parts and members are represented by the same reference numerals or symbols throughout the accompanying drawings.

Figure 1:
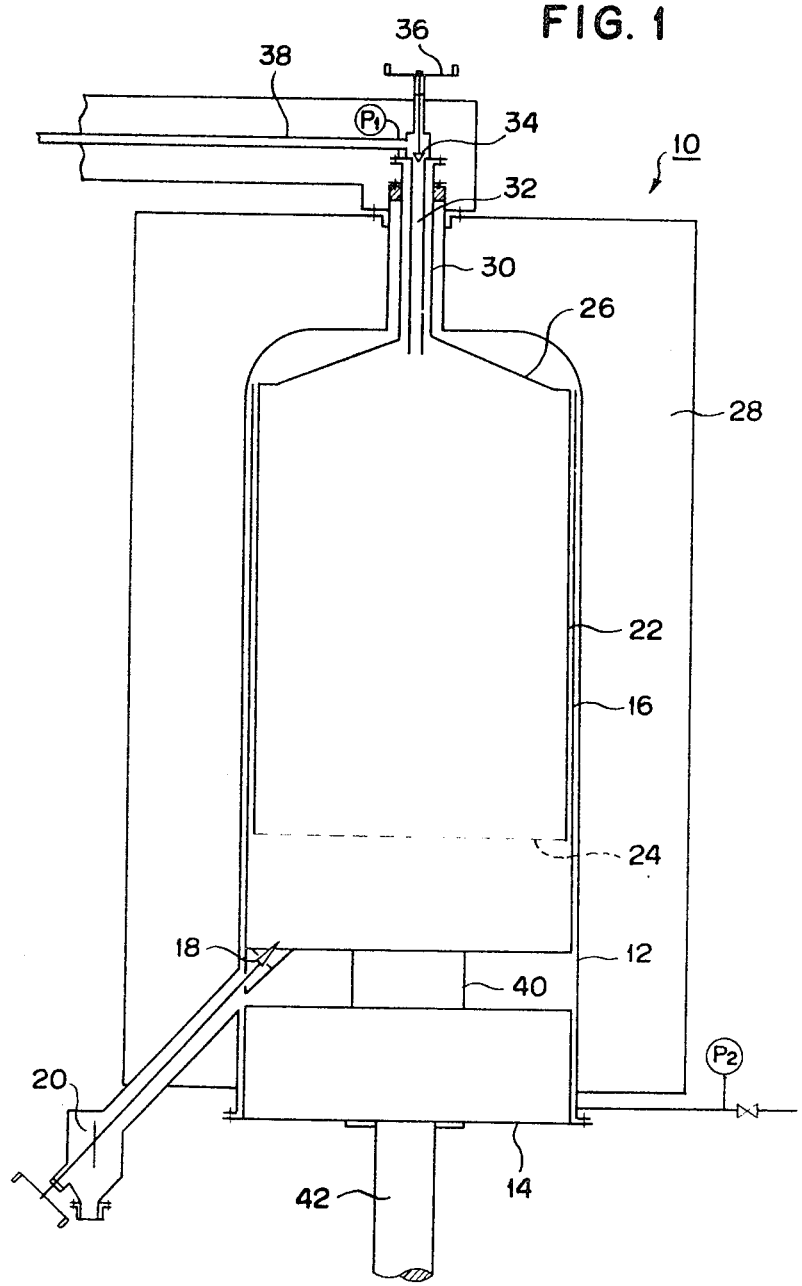
FIG. 1 is a simplified vertical sectional view of a reducing device embodying the present invention.

Referring to FIG. 1, a reducing device 10 according to the present invention is provided with an outer cylinder 12 having a removable bottom plate 14, and the outer cylinder 12 is adapted to be heated in a heating furnace 28. In the outer cylinder 12 there are provided an intermediate cylinder 16 and an inner cylinder 22 with small spacings between them. The intermediate cylinder 16 acts as a container for holding a metallic reducing agent, such as magnesium or sodium, together with the by-products of the reducing reactions between the metallic reducing agent and a raw material chloride, such as magnesium chloride or sodium chloride, and the upper end of the intermediate cylinder 16 is open to the interior of the outer cylinder 12. The inner cylinder 22 is provided with a holding plate or a carrier screen 24 secured to the lower end thereof for carrying reaction product metal therein, and the upper end of the inner cylinder 22 is separated from the interior of the outer cylinder 12 by a cover 26.

The inner cylinder 22 communicates externally of the reaction chamber, which is defined by the inner cylinder, through a pipe member 30 extending through the cover 26. A feed pipe 32 for feeding the volatile metallic chloride is placed within the pipe member 30. Thus, the raw material consisting of volatile metallic chloride is fed from a raw material source (not shown) to the inner cylinder 22 by means of a pump $P_1$ through an outer pipe member 38, a valve port 34 located at the top of the aforementioned feed pipe 32 which is opened by a valve actuating means 36 and the feed pipe itself.

In this particular embodiment of the invention, there is provided a hole 18 in the bottom wall of the intermediate cylinder 16, and the hole 18 can be opened and closed by an actuating means mounted without of the reaction chamber. The hole 18 is provided for extracting undesirable impurities, such as, by-products, remaining metallic reducing agent, and non-reacted chloride, prior to vacuum distillation of the desired products. The intermediate cylinder 16 is secured to the bottom plate 14 of the outer cylinder through an intermediate cylinder supporter 40, and the bottom plate 14 is in turn mounted on a reciprocating means 42 whereby the bottom of the outer cylinder 12 can be opened by actuating the reciprocating means to remove reaction products therefrom and to load the reducing agent therein.

The operation of the reducing device of FIG. 1 will now be described in an example for producing metallic zirconium by reducing zirconium tetrachloride with metallic magnesium.

The inner cylinder and the intermediate cylinder were loaded with 750 kg. of magnesium, and the inside space of the outer cylinder was degassed thoroughly to a level close to vacuum, and then filled with argon gas to a level somewhat higher than an atmospheric pressure. Then, the outer pipe member 38 was connected to a source of zirconium tetrachloride, and the pipe member was controlled so as to keep the raw material zirconium tetrachloride at a temperature higher than 350° C., and at the same time, the reaction chamber was heated by the furnace 28 to keep the temperature thereof at 750° C. Thereafter, the valve port 34 was opened to load 2600 kg. of zirconium tetrachloride into the reaction chamber through the feed pipe 32 for reduction. Upon completion of the reduction, the reciprocating means 42 was actuated to remove non-reacted materials and by-products, and then, the reduction products carried on the carrier screen were drawn out by a pump $P_2$ through an outlet opening thereof. The reduction products were subjected to vacuum distillation at a temperature of 900 to 950° C. for elimination of impurities contained therein. Thus, 1010 kg. of metallic zirconium were obtained, and the yield was as high as 99%. Such yield is considerably higher than that attained by conventional processes, which has been 95% at most. Furthermore, the reduction time with the device of the invention was 20 to 25 hours, which was less than half of that of conventional processes.

In the above example, valve 20, as shown in FIG. 1, was kept open during the reduction process, and 1700 kg. of magnesium chloride were exhausted therethrough. The raw material zirconium tetrachloride was stored in the form of a double salt with sodium chloride, and the zirconium tetrachloride was produced by evaporation just prior to the reducing reaction by heating the thus stored double salt at a temperature between 350 to 600° C. It is also permissible to store the zirconium tetrachloride in the liquid phase by using a high pressure storage tank.

Furthermore, it is also possible to improve the rate of reaction of the magnesium by tightly sealing the inner cylinder and the bottom plate of the outer cylinder for facilitating participation of the magnesium loaded in the intermediate and inner cylinders in the desired reaction.

The reason why the reducing device of the present invention has a considerably improved performance in comparison with conventional reducing device is firstly due to the fact that the reaction chamber is free from the formation of local low temperature regions and losses resulting from both sublimation and condensation of magnesium and losses of zirconium tetrachloride resulting from formation of lower zirconium chloride are prevented, and secondly due to the fact that the raw material zirconium tetrachloride is loaded at the center of the reaction chamber by the feed pipe so as to prevent the formation of alloys owing to contact of the inner wall of the inner cylinder with activated zirconium produced therein.

Figure 2:
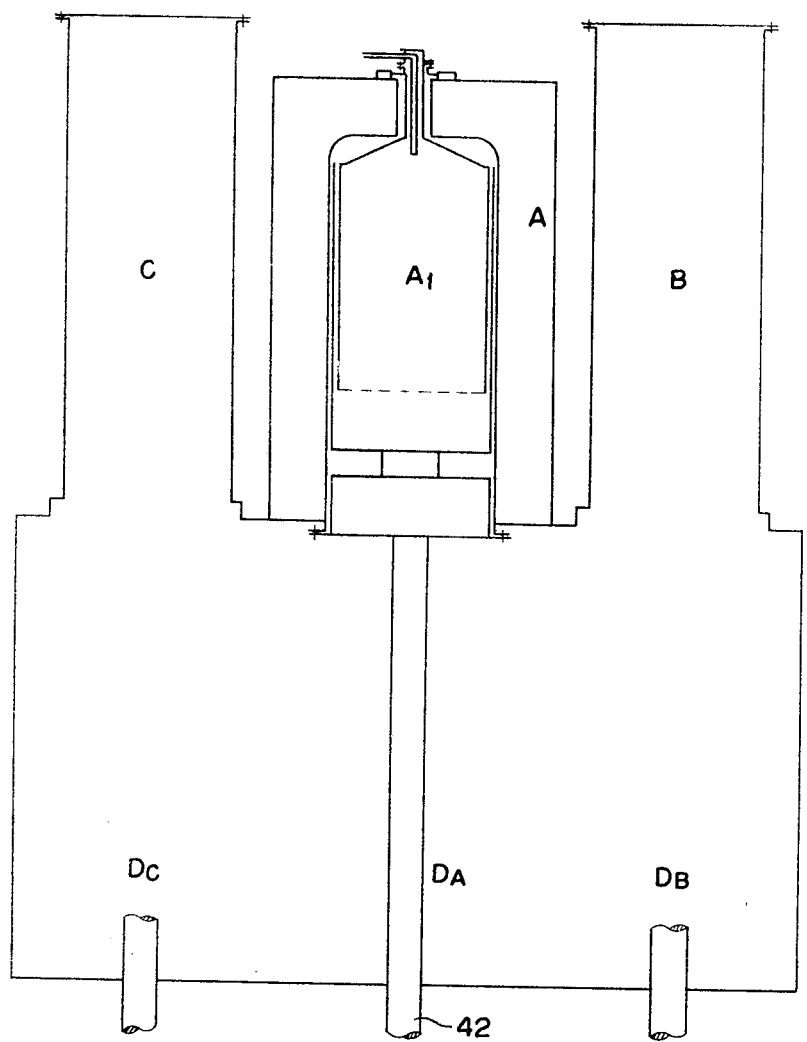
FIG. 2 is a diagrammatic sectional view of a device for enabling semi-continuous operation of the reducing device of FIG. 1.

FIG. 2 shows a system for actuating the reducing device of FIG. 1 in a semi-continuous fashion by providing a cooling chamber, a loading chamber and a reducing chamber each adapted to receive the reducing device. In FIG. 2, the reducing device of FIG. 1 is generally designated by A1, and B and C respectively represent the cooling chamber and the loading chamber. In this particular embodiment, the reducing device A1 (exclusive of the outer cylinder) is mounted on a movable reciprocating device 42. In operation, the reciprocating device is located at the position of the loading chamber C, as shown in $D_C$ in the figure, to raise the intermediate and inner cylinders of the reducing device into the loading chamber C for loading metallic reducing agents therein. Then, the reducing device A1 is lowered out of the chamber C, and the reciprocating device 42 is moved to a position underneath reducing chamber A, as shown by $D_A$ in FIG. 2, to raise the device A1 so that it can be properly engaged with an outer cylinder mounted in the reducing chamber for carrying out the reducing reaction therein. Upon completion of the reducing reaction, the device A1 is again lowered away from the outer cylinder in the chamber A by means of the reciprocating device 42. The reciprocating device is now moved to a position underneath the cooling chamber B, as shown by $D_B$ in the figure, by means of a suitable transfer mechanism (not shown). At the position $D_B$ the device A1 is raised into the cooling chamber B for cooling, at which time a bottom plate engageable with the outer cylinder is brought into tight contact with the lower end of the cooling chamber B through a packing member. After cooling, the device A1 is lowered from the chamber B for removal of the reduction products therefrom, and the reciprocating device 42 is brought back to the position $D_C$ to complete a cycle of the semi-continuous operation.

Figure 3:
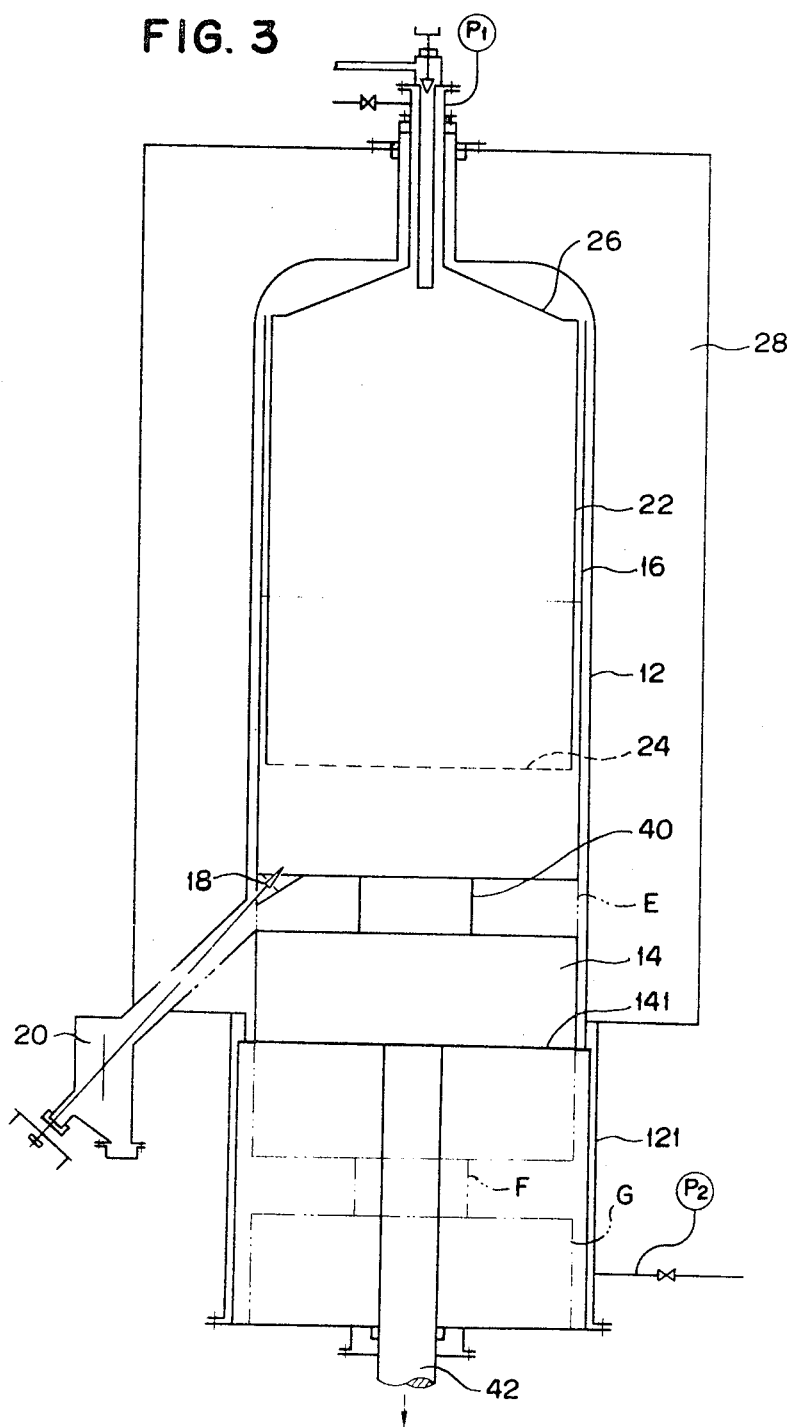
FIG. 3 is a similar view to FIG. 1, illustrating a device for simultaneously reducing and refining materials.

FIG. 3 illustrates a modification 101 of the reducing device of FIG. 1, with which both reduction and refinement of raw materials can be carried out simultaneously. Those members of the device 101 which are directly connected with the reducing reaction are identical with the corresponding members of the device 10, as shown in FIG. 1, and detailed description thereof will not be made again.

The device 101 is different from the device 10 in that the former is provided with a second outer cylinder 121 below outer cylinder 12. In the particular embodiment shown in FIG. 3, there is provided a partitioning wall 141 for separating the reaction chamber in the outer cylinder 12 from a cooling chamber in the second outer cylinder 121 in a sealed manner throughout the reducing operation. However, such sealing need not be perfect, and the partitioning wall 141 can even be dispensed with under certain conditions, is so desired. The reducing operation can be carried out with the device 101 in the same manner as the device 10, as described hereinbefore referring to FIG. 1. By-products of the reducing reaction, such as magnesium chloride or sodium chloride, are removed from the outer cylinder by opening the outlet opening 18 by means of a valve 20 during and at the end of the reducing operation. Upon completion of the reducing reaction, intermediate chamber 16 is lowered to a position shown by broken lines E while moving an intermediate cylinder holder 40 and a bottom plate 14 to positions shown by broken lines F and G respectively by means of a reciprocating means 42. In this particular embodiment, with the intermediate and inner cylinders thus lowered, the inside space of the outer cylinder is evacuated for evaporating impurities contained in the reduction products, such as metallic magnesium or sodium, magnesium chloride, or sodium chloride. The impurities thus evaporated are condensed at the lower portion of the intermediate cylinder. Thereby, the reduction products are refined in the same process with the reduction itself.

Further, if the temperature of the intermediate cylinder is set above the solidifying point of magnesium, further treatments may be simplified by discharging distilled magnesium in a fused state.

The operation of the particular embodiment of the invention, as shown in FIG. 3, will now be described in an example for producing metallic titanium by reducing titanium tetrachloride with metallic magnesium.

The inner and intermediate cylinders are charged with 3000 kg. of magnesium, and the inside space of the outer cylinder was degassed to a degree close to vacuum, and thereafter, the space was filled with argon gas to a level somewhat higher than atmospheric pressure. A raw material source was heated to feed 9300 kg. of raw material consisting of titanium tetrachloride into the reaction chamber in the inner cylinder by dripping at a temperature between 750 to 950° C. Throughout the reducing reaction and at the end of the reaction, a total of 8500 kg. of magnesium chloride were exhausted through the groove 18. Then, the intermediate cylinder was lowered and the inside space of the outer cylinder was evacuated and evaporation was made for about 20 hours by keeping the temperature of the space at 900 to 1000° C. Thereafter it was cooled. Thus, 2360 kg. of titanium were obtained, and the titanium thus produced proved to have a B.H.N. hardness of 70 to 80, and its purity was very high.

In addition to the features of the reducing device of

FIG. 1, as described hereinbefore, this particular embodiment of the present invention is superior to conventional reducing devices in that the reduction products can be refined directly after being reduced without exposing them to the atmosphere, so that the temperature of the reduction products at the central portion thereof can be kept high for enabling evaporation of impurities, such as magnesium and magnesium chloride, to proceed from the central portion thereof toward the inside wall of the inner cylinder, and accordingly, the temperature can be kept at a comparatively low level by heating from without. Thus, wear on the outer cylinder, by oxidation, can be prevented, and formation of alloys between the inner cylinder and the spongy products produced therein can be also prevented. Furthermore, the purity of the reaction products can be also improved considerably.

FIG. 4 illustrates a system similar to that of FIG. 2, which is usable for semi-continuous operation of the reducing device of FIG. 3. The construction of the system of FIG. 4 is identical with that of FIG. 2 except for the fact that the structure of the reducing device A2 of FIG. 4 is in accordance with that of FIG. 3 and different from that of A1 described hereinbefore referring to FIG. 2, Therefore, the operation of the system of FIG. 4 is apparent for those skilled in the art, and no detailed description is repeated hereinafter.

For simplicity, in the preceding systems of FIGS. 2 and 4, only one reducing device or simultaneous reducing and refining device is shown together with one each of a charging chamber for charging metallic reducing agents, a reducing chamber (or a simultaneous reducing and refining chamber), and a cooling chamber. However, it is possible to carry out charging reducing (or simultaneous reducing and refining), and cooling operations with only one reducing chamber. Furthermore, it is also possible to prepare three sets of inner and intermediate cylinders so as to assign each pair to the reducing agent charging chamber, reducing (or simultaneously reducing and refining) chamber, and a cooling chamber respectively, and to transfer them in turn in a cyclic manner. Such and other modifications are apparent to those skilled in the art and it should be understood that they are within the scope of the present invention.

Although the present invention has been described with a certain degree of particularity only by way of examples referring to the accompanying drawings, it should be understood that various modifications in the details of construction and the combination and arrangement of parts may be resorted to without departing from the spirit and the scope of the invention as hereinafter claimed.

What is claimed is:

1. A device for producing metals from the corresponding volatile chlorides thereof, said device comprising an outer cylinder enclosing an interior space, said outer cylinder having a top and a removable bottom plate to separate the interior space thereof from the outside thereof, a furnace to heat the outer cylinder, an intermediate cylinder disposed within the outer cylinder for receiving a metallic reducing agent and reduction byproducts, an inner cylinder disposed within the intermediate cylinder and having a carrier screen at the lower end thereof for holding reduction products against gravitational forces and a cover at the top end thereof communicating with a feed pipe for feeding the volatile chlorides and further comprising means for vertically reciprocating the intermediate cylinder, whereby immediately upon completion of the reducing reaction, the intermediate cylinder can be lowered to decrease the gas pressure in the interior space of the outer cylinder to enable refining of the reduction products by vacuum evaporating the reduction by-products contained therein.

2. A device according to claim 1, wherein the intermediate cylinder is provided with an exhaust opening for exhausting non-reacted materials and reduction by-products therefrom.

3. A device according to claim 1 and further comprising a loading chamber for loading reducing agents, a reducing chamber secured to said outer cylinder, and a cooling chamber, wherein at least two of said intermediate and inner cylinders are adapted for being transferred between said chambers in turn.

References Cited

UNITED STATES PATENTS

| | | | |
|---|---|---|---|
| 2,556,763 | 6/1951 | Maddex | 75—84.5 X |
| 2,663,634 | 12/1953 | Stoddard et al. | 75—84.5 |
| 3,252,823 | 5/1966 | Jacobson et al. | 75—84.5 X |

FOREIGN PATENTS

| | | |
|---|---|---|
| 791,121 | 2/1958 | Great Britain. |
| 1,084,923 | 7/1960 | Japan. |

J. SPENCER OVERHOLSER, Primary Examiner

U.S. Cl. X.R.

75—84.5